United States Patent [19]

Noble

[11] Patent Number: 4,715,842

[45] Date of Patent: Dec. 29, 1987

[54] DOLL CONSTRUCTION

[76] Inventor: Edward C. Noble, 700 Hicks Ave., Jackson, Ala. 36545

[21] Appl. No.: 898,516

[22] Filed: Aug. 21, 1986

[51] Int. Cl.$^4$ ............ A63H 33/32; G09B 19/00
[52] U.S. Cl. .................. 446/268; 446/390; 434/233; 40/586
[58] Field of Search .......... 446/268, 390; 283/69; 40/21 C, 586; 434/233

[56] References Cited

U.S. PATENT DOCUMENTS

| | | | |
|---|---|---|---|
| 623,966 | 5/1899 | Barkley | 434/233 |
| 1,499,955 | 7/1924 | Stoddard | 283/69 |
| 1,607,946 | 11/1926 | Crosskey | 283/69 |
| 1,770,147 | 7/1930 | Silver et al. | 446/390 |
| 2,317,227 | 4/1943 | Sherwood | 40/586 |
| 2,570,908 | 10/1951 | Behr | 434/233 |
| 3,447,818 | 6/1969 | De Pizzol | 283/69 |
| 3,501,849 | 3/1970 | Olsen | 434/233 |
| 3,532,344 | 10/1970 | Masstab | 2/DIG. 6 |
| 4,325,570 | 4/1982 | Estrada | 283/69 |
| 4,519,781 | 5/1985 | Boyd | 2/DIG. 6 |

FOREIGN PATENT DOCUMENTS

| | | | |
|---|---|---|---|
| 1146795 | 4/1963 | Fed. Rep. of Germany | 446/390 |
| 2263332 | 6/1974 | Fed. Rep. of Germany | 434/233 |
| 1357068 | 4/1963 | France | 40/586 |

Primary Examiner—Victor N. Sakran
Attorney, Agent, or Firm—Nies, Webner, Kurz & Bergert

[57] ABSTRACT

A doll construction is disclosed wherein fingerprints are provided for each doll, with a different set of fingerprints for each doll, and with a record being provided for recording fingerprint data and other information concerning the characteristics of each doll. A similar record of information is maintained for the child owning the doll. A listing of safety rules is also provided for use by the parents and the child. The doll construction is provided as a means of encouraging parents to fingerprint their children and to educate them by teaching them the safety rules, thus avoiding having the child become missing from his or her family. In one embodiment, a code is selected for the fingerprints of each doll, utilizing letters such as an"O", a "U" and an inverted "U" with such code letters being provided on each of the fingers and thumb of the doll in the position which would be for the fingerprints of a real person. By changing the code so that each hand of successive dolls has a different arrangement of letters from that of any other doll, the situation is provided whereby no two dolls are produced having the same fingerprints.

3 Claims, 4 Drawing Figures

DOLL CONSTRUCTION

BACKGROUND AND SUMMARY OF THE INVENTION

The present invention relates to a doll construction. More particularly, the present invention relates to a doll having fingerprints with the fingerprints being different for each doll and with a record being provided for recording fingerprint data and other information concerning the characteristics of each doll.

The applicant has become concerned that thousands of children are missing in the United States today. Some are found safe but others are never found. In an effort to allow parents to supply their children with all possible protection, and to make it easier to talk to children on this subject, the present doll construction is provided as a means of encouraging all parents to fingerprint their children and to educate them by teaching them the safety rules. By the use of the doll construction of the present invention, the children are also provided with a means for teaching the rules to their doll. The applicant hopes that such dolls will prevent many children from becoming a statistic.

DESCRIPTION OF THE PREFERRED EMBODIMENTS

In the embodiments of the invention as shown in FIGS. 1 through 4, there is provided a doll in the form of a small human figure 10 formed of cloth, plastic or other similar material and provided with suitable padding to simulate the form and general shape of a small child. Suitable materials are provided for the hair 12 and features of the face 14 so as to provide a realistic appearance to the doll. Suitable clothing 16 is selected for dressing the doll so as to simulate either a young boy or girl.

Figure 1:
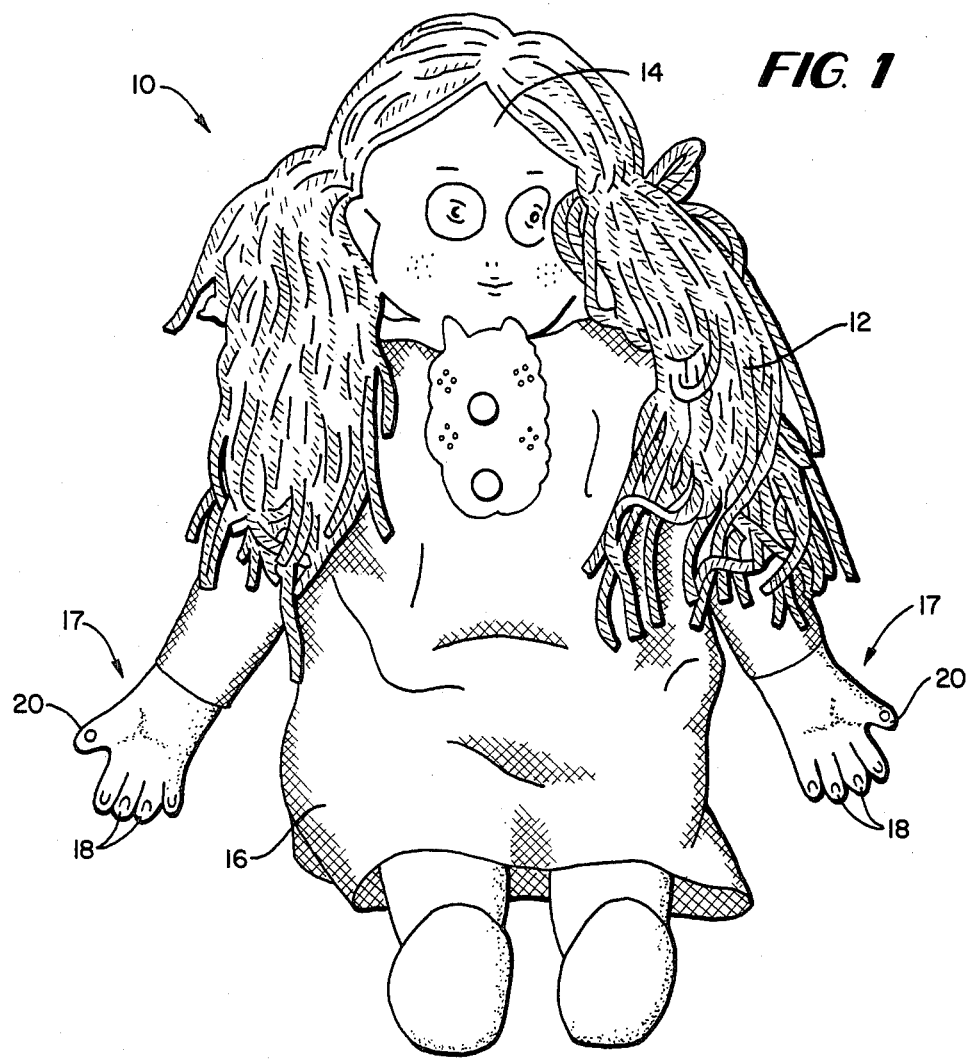
FIG. 1 is a perspective view of a doll showing the fingerprints on the hands thereof.
Figure 2:
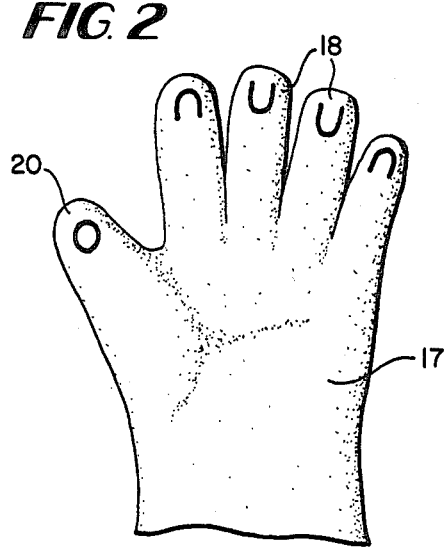
FIG. 2 is an enlarged view of a portion of FIG. 1 showing the fingerprints on the hand of the doll.
Figure 3:
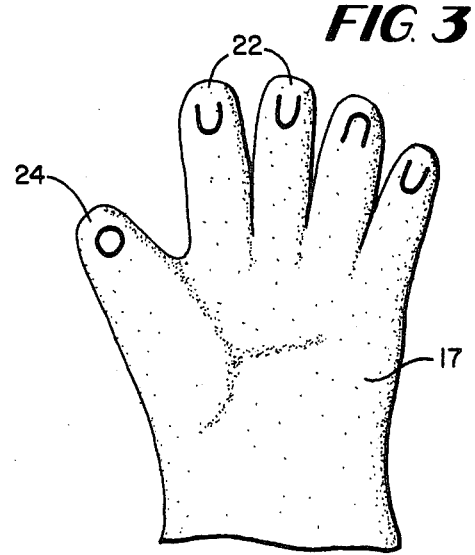
FIG. 3 is an enlarged view similar to FIG. 2 showing an alternative construction of a second doll with fingerprints different from those of the doll of FIG. 2.

On the hands 17 of the doll, a symbol is provided on each of the fingers 18 and thumb 20 in the position which would be for the fingerprints of a real person. A suitable code may be selected so that different symbols are provided on the different fingers, as, for example, an 'O' a 'U' and an inverted 'U' as shown on the dolls in FIGS. 2 and 3 and also in the information sheet in FIG. 4. By changing the code so that at least one finger 22 or thumb 24 on each hand 26 of a second doll has a different symbol from the first doll 10, as shown in FIG. 3, the situation is provided whereby no two dolls are produced having the same fingerprints.

Figure 4:
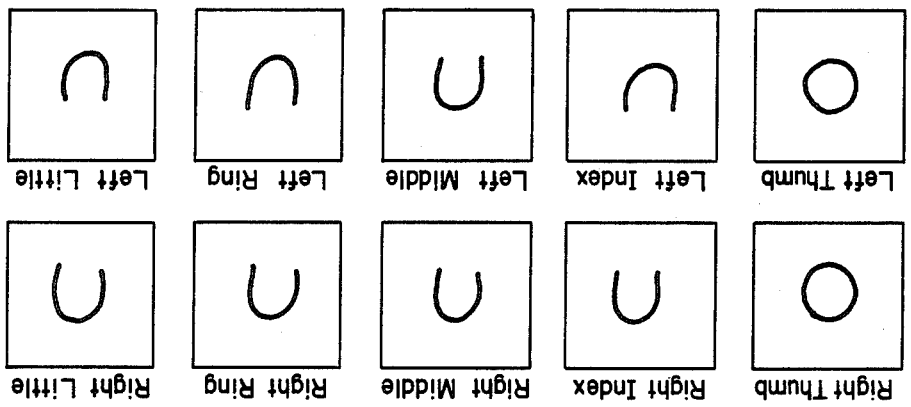
FIG. 4 shows an information sheet with statistics and fingerprints which may be compiled for each doll.

The young person who owns the doll 10 is encouraged to fill in the name and other characteristics of the doll in the spaces as indicated in the record of information sheet 28 of FIG. 4. In one embodiment, the dolls may be known as "Thumb Kids". A similar information and fingerprinting sheet should be provided for recording information pertaining to the child who owns the doll so as to encourage the record keeping procedure and make the process seem more familiar to the child. In addition, a listing of safety rules may be provided for the purpose of making the parents and the child aware of actions to be taken in the event of an emergency and to reduce the chances of the child becoming missing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A doll construction which comprises: an inanimate article in the form of a small figure in the general shape of a human with two arms, each arm having a hand with a plurality of fingers and a thumb joined thereto; and a fingerprint on each of the fingers and thumbs of said doll, each of said fingerprints being located in the fingerprint position at the outer end of said finger or thumb on the palm side of the hand, and with each fingerprint being in the form of a symbol such as a letter or numeral which serves to identify said doll; and a record keeping sheet having marked spaces for entering fingerprint information for each finger and thumb of the doll, thus identifying and distinguishing the doll from other similar dolls.

2. The doll construction of claim 1 wherein said fingerprint for each finger and thumb is a symbol selected from the group consisting of an "O", a "U" and an inverted "U".

3. The doll construction of claim 1 wherein said record keeping sheet is further provided with marked spaces for entering biographical data for the doll.

* * * * *